T. B. HUNTER.
METHOD OF PREPARING AND PACKING RAISINS.
APPLICATION FILED JAN. 26, 1920.

1,341,057. Patented May 25, 1920.
3 SHEETS—SHEET 1.

INVENTOR
Thomas B. Hunter
BY
Miller & Henry
ATTORNEYS

T. B. HUNTER.
METHOD OF PREPARING AND PACKING RAISINS.
APPLICATION FILED JAN. 26, 1920.

1,341,057.

Patented May 25, 1920.

INVENTOR
Thomas B Hunter
BY
Miller & Henry
ATTORNEYS

UNITED STATES PATENT OFFICE.

THOMAS B. HUNTER, OF SAN FRANCISCO, CALIFORNIA.

METHOD OF PREPARING AND PACKING RAISINS.

1,341,057.  Specification of Letters Patent.  Patented May 25, 1920.

Application filed January 26, 1920. Serial No. 354,130.

*To all whom it may concern:*

Be it known that I, THOMAS B. HUNTER, a citizen of the United States, and a resident of the city and county of San Francisco, State of California, have invented new and useful Improvements in Methods of Preparing and Packing Raisins, of which the following is a specification.

My invention has for its object the quick and economical preparation of raisins for the market, and consists of a series of processing steps through suitable apparatus whereby the raisins as received from the vineyard, have their stems removed and are graded, and wherein they are dried and subsequently capstemmed, and if desired, seeded, and then packed, the process being automatic throughout.

By referring to the accompanying drawings my invention will be made clear.

Throughout the drawings similar numerals refer to identical parts.

Figure 1:
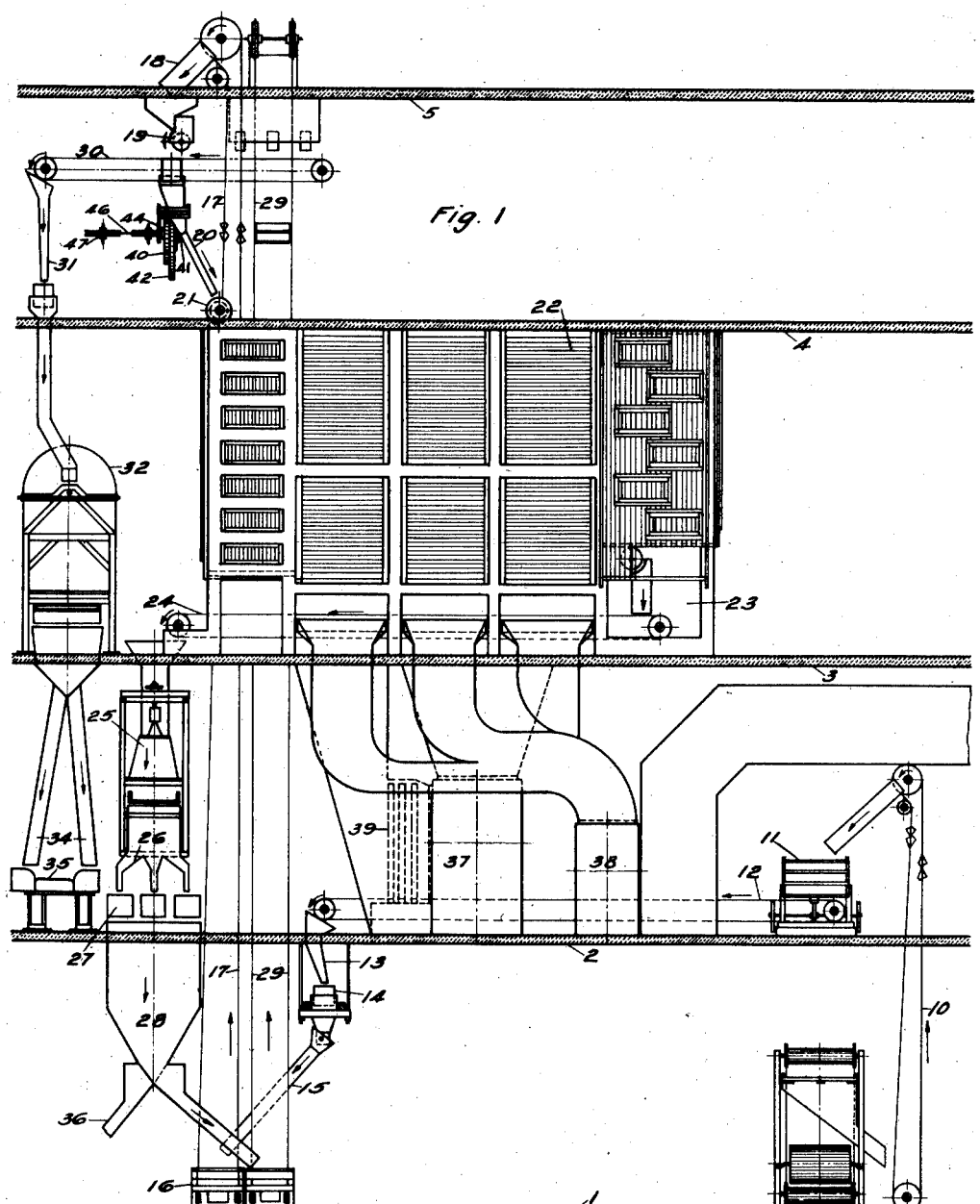
Figure 1 is a cross section partially diagrammatic, of a plant equipped to utilize my process.

The main building floor is indicated by the numeral 1; the second story floor by the numeral 2; the third floor by the numeral 3; fourth floor by the numeral 4, and fifth floor by the numeral 5.

Figure 2:
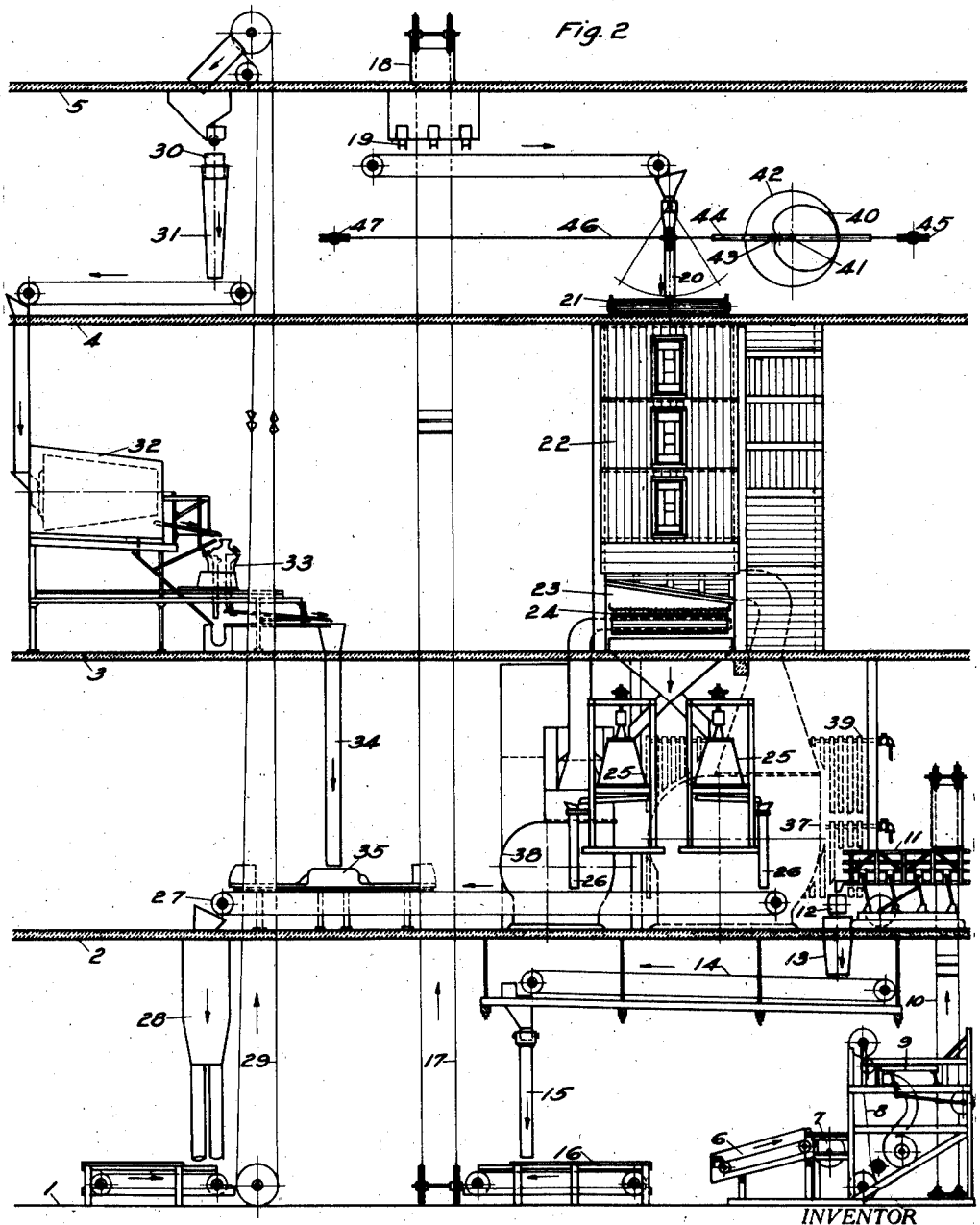
Fig. 2 is a cross section, partially diagrammatic, and at right angles to Fig. 1.
Figure 3:
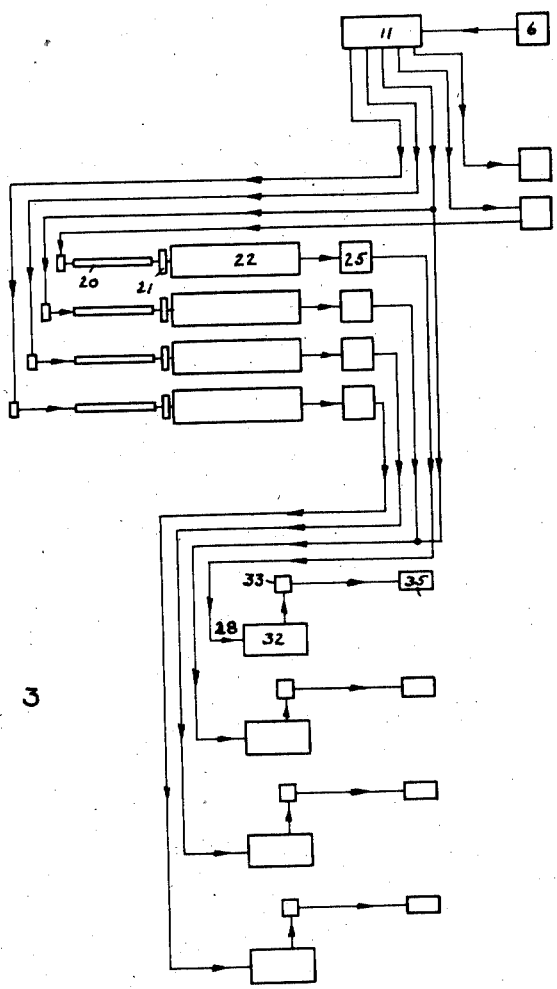
Fig. 3 is a graphic showing of the steps of the process.

The apparatus is arranged on the several floors for economy of space in handling, and in the operating plant in which my apparatus and process are incorporated there are a plurality of units similar to those indicated in the Figs. 1 and 2, and it is to be understood that in the description which follows a plurality of machine units may be employed and supplied by a single conveying means, and may deliver their partially processed product to one or more conveying means for intertransit to other machines.

The numeral 6 indicates a receiving belt on which are dumped the raisins as they come from the vineyard and in various sizes and various sized bunches. From this stage the raisins pass through the stemmer 7 where the bunches are broken up into individual raisins, which raisins, however, are not sufficiently dry and still retain their short capstems. From 7 they pass by the elevator 8 to the shaking screen and fan 9, which removes the dirt and the separated stems, and then to the elevating belt 10 and the grader 11, where the raisins are separated into their various sizes. They now are conveyed as by a plurality of belts (one for each grade) one of which is shown at 12 and from there through the chute 13 on to the conveyer belt 14, and through the adjustable spout 15, and elevator feeding belt 16. From 16 they are conveyed by the elevator as 17, which conveys them to the top floor, from which they descend through the hopper 18 by the measuring or equalizing wheel 19, from which they are transferred through the swinging spout 20, which swinging spout has a specially controlled motion described more fully below, and which distributes the raisins equally over the spreading wheel 21. From this spreading wheel they are equally distributed over the plurality of drapers contained in the drying compartment 22, and which drier is specifically described in my copending application Serial No. 353,916, filed Jan. 26, 1920, and to which reference is herein made.

The drying of the raisins in the warm air of this drier, followed by the treatment with cold air in its lower compartment 23, on the draper 24, prepares the raisins still containing their capstems for treatment in the capstemmer 25, 25. Two of these capstemmers are shown in the drawings as being fed from the single drier, and the raisins are distributed from the capstemmer as capstemmed raisins, preferably through the plurality of spouts 26, 26, on to the belts 27, and then into the elevator feeding spout 28, from which they are distributed as to bucket elevator belt 29, which again conveys them to the higher elevation, from which they are distributed as by the conveyer 30, spout 31, into the processer 32, where the raisin is properly conditioned for seeding, packing and preservation.

From the processer 32 they are seeded by the apparatus shown at 33, and are then delivered, as through the spout 34, 34 to the packing machine or tables as at 35, where they are boxed and subsequently handled in any well known way, not shown.

It will be obvious that from 28, instead of distributing the raisins on the conveying belt 29 they may be diverted as by suitable diaphragm gates by the spout 36, and thence directly back as finished capstemmed raisins; or, if diverted to the belt 29, they may be passed through the processer 32 and seeder 33, and subsequently delivered as finished seeded raisins.

The drying chamber 22 consists of a plurality of drapers which convey the raisins from the inlet at 21 to the compartment 23, subjecting them during said travel to circulation of drying air. They thus arrive at compartment 23 on the draper 24, and within the compartment 23 are subjected to cold air treatment. This has the advantage of completing the conditioning for efficient capstemming.

The circulation of the drying air for the draper belts in the compartment 22 is accomplished as by the fan 37, and the cold air circulation of the compartment 23 by the blower 38, the air passing through the blower 37 being warmed, as by the steam coil 39, and the drying qualities of the circulating air in the chamber 22 may be reinforced by compound heating, as set forth in the copending application referred to above.

The swinging spouts 20 are constructed and adapted to a constant rate of travel during their swinging movement, as distinguished from the rate which would be performed by a pendulum or by a spout swinging from a crank connected with a true circular movement, as it is obvious that they would otherwise pile the raisins on each side of the spreading wheel 21 instead of at the center, due to the relatively lower rate of pendulum movement. I therefore swing these spouts at a constant rate during each of the increments of swinging by the cam member 40, mounted on the axle 41, operated by the driving wheel 42, from any suitable means.

Roller 43 is mounted upon the sliding member 44 and is held against the surface of the cam 40 as by a weight, not shown but well known, operating from the pulley 45, and pulling against the member 44 to retain a rolling contact between 43 and 40.

Member 44 is connected with a series of spouts 20, as by cable 46, the weight acting over the pulley 45. The cable 46 may be returned on the opposite side as around the end pulley 47, so that the cable with the member 44 will perform a complete loop around the pulleys 45, 47 and will be actuated in its reciprocating motion by the cam surface 40, which cam is rotated about the axle 41 at a constant rate. The movement of the cable 46 will, due to the cam, be constant substantially throughout its swing.

This cam surface 40 is generated on a curve such that with the constant rate of rotation of 42, the movement of the cable 46 will be substantially constant in each direction, during each consecutive instant of its movement. The spout 20 will therefore travel the same distance during each instant of its swinging in each direction, and will therefore feed raisins at a constant rate throughout the entire length of the spreading wheel 21, and will therefore cause an equal distribution of the layer of raisins upon the drapers in the compartment 22.

I claim:

1. The process of preparing raisins from raisin grapes which consists of causing them to pass through a current of extra heated air, thence through a longer path in a current of hot air and thence for a relatively short path in a current of cold air.

2. The process of preparing raisins from raisin grapes which consists of causing them to pass through a current of extra heated air, thence through a longer path in a current of hot air and thence for a relatively short path in a current of cold air, and thence quickly capstemming them.

3. The process of preparing raisins from raisin grapes which consists of causing them to pass through a current of extra heated air, thence through a longer path in a current of hot air and thence for a relatively short path in a current of cold air, and thence reconditioning them by treatment with steam to replace the required amount of moisture previously abstracted.

4. The process of preparing raisins from raisin grapes which consists of causing them to pass through a current of extra heated air, thence through a longer path in a current of hot air and thence for a relatively short path in a current of cold air, and thence quickly capstemming them, and thence reconditioning them by treatment with steam to replace the required amount of moisture previously abstracted.

5. The process of preparing raisins from raisin grapes which consists of causing them to pass through a current of extra heated air, thence through a longer path in a current of hot air, and thence for a relatively short path in a current of cold air, and thence reconditioning them by treatment with steam to replace the required amount of moisture previously abstracted, and then passing them through means by which the seeds are removed.

In testimony whereof, I have hereunto set my hand at San Francisco, California this 20th day of January, 1920.

THOMAS B. HUNTER.